Jan. 14, 1930.    A. B. FOWLER    1,743,203
MACHINE FOR USE IN THE MANUFACTURE OF BOOTS AND SHOES
Filed Dec. 16, 1926    7 Sheets-Sheet 1

Fig.1.

INVENTOR.
ALFRED B. FOWLER, DEC'D
MARY F. FOWLER, ADMRX.
BY HER ATTORNEY

Jan. 14, 1930.  A. B. FOWLER  1,743,203
MACHINE FOR USE IN THE MANUFACTURE OF BOOTS AND SHOES
Filed Dec. 16, 1926  7 Sheets-Sheet 6

INVENTOR.
ALFRED B. FOWLER, DEC'D
MARY F. FOWLER ADMRX.
BY HER ATTORNEY

Jan. 14, 1930.   A. B. FOWLER   1,743,203
MACHINE FOR USE IN THE MANUFACTURE OF BOOTS AND SHOES
Filed Dec. 16, 1926   7 Sheets-Sheet 7

INVENTOR.
ALFRED B. FOWLER, DEC'D
MARY F. FOWLER, ADMRX.
BY HER ATTORNEY

UNITED STATES PATENT OFFICE

ALFRED B. FOWLER, DECEASED, LATE OF BEVERLY, MASSACHUSETTS, BY MARY F. FOWLER, ADMINISTRATRIX, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR USE IN THE MANUFACTURE OF BOOTS AND SHOES

Application filed December 16, 1926. Serial No. 155,290.

This invention relates to machines for use in the manufacture of boots and shoes and is herein illustrated as embodied in a multi-station machine for performing finishing operations on heels of boots and shoes, this machine being of the type disclosed in United States Letters Patent No. 1,630,565, granted May 31, 1927, upon an application, filed April 6, 1923, of which this application is a continuation in part.

The general object of the invention is to provide an improved machine of this class which will require less effort and attention upon the part of the operator and which will perform its work more efficiently.

Machines of this type are commonly provided with a foot-operated treadle by means of which pressure may be applied to a jacking mechanism arranged to clamp a shoe upon a traveling carrier. It is necessary for the proper operation of such a clamping device that considerable pressure be applied to the treadle. As a consequence, attendance upon the machine becomes somewhat fatiguing and proper clamping pressure is not always assured. Accordingly, one feature of the invention resides in novel mechanism for applying power to the jacking mechanism with the result that it is only necessary for the operator to apply sufficient pressure to the controlling treadle to set this power-operated mechanism in action. In accordance with other features of the invention, the illustrated machine is provided with a work holding jack comprising a resiliently supported member for engagement with one surface of the work and with a work supporting spindle having clamping means arranged to hold the spindle in any desired position, and the jack operating mechanism is constructed and arranged to move this spindle to clamp the work against the resiliently supported member through an adjustably predetermined distance so that the position of the rand crease of the shoe may be exactly determined as the shoe is jacked. This insures the proper presentation of the shoe to the various tools of the machine. In machines of this type, the work clamping devices of the jacks are rotatably mounted upon an endless carrier so that various parts of the periphery of the work may be presented to the tools of the machine. With this in mind, the operation of jacking a shoe is also facilitated by novel devices arranged to bring the co-operating parts of the clamping mechanism into a predetermined position at the jacking station.

As in the illustrated machine, the tools which are provided for the heel finishing operation commonly comprise a beading tool arranged to apply a decorative marking around the periphery of the heel near its upper edge. In automatic machines of the type under consideration, this tool is brought into engagement with each successive piece of work and held under pressure against the heel as relative movement is provided between the heel and the tool to cause the tool to operate around the periphery of the heel. In accordance with still other features of the invention, the illustrated machine is provided with means for resiliently holding the flange of the beading tool in the rand crease of the shoe. The arrangement is such that after the tool has been brought into engagement with the work, additional pressure is applied to hold the flange of the tool more firmly in position. When such a beading tool is to be used upon shoes of the type employing short soles, it will be understood that its operation covers not only the periphery of the heel itself but, in addition, a part of the edge of the sole where it underlies the heel. It has been found that there may be a considerable difference in the character of the leather in the highly compressed heel and in this end portion of the sole. Accordingly, as the tool is brought into engagement with the work, if sufficient pressure is applied to produce a satisfactory beading operation upon the heel, the pressure may be unduly great with respect to the edge of the sole itself. With this in view, another feature of the invention resides in the provision of novel mechanism for varying during the cycle of operation the pressure applied to the tool to force it into engagement with the work when the tool and the work are given a relative movement to carry the tool around the periphery of the rear end of the shoe.

The illustrated machine comprises an endless carrier in the form of a rotating turret-like table upon which are supported a plurality of work-clamping shoe supports and a plurality of tools, arranged adjacent to, but outside of the carrier, in a position so that they may be utilized to treat the individual pieces of work which are presented to them by the carrier. These tools, which may take a variety of forms, are arranged in the present machine to apply wax and to burnish the periphery of a heel from one breast corner to the other, to bead the upper edge of the heel adjacent to the rand crease of the shoe, and to polish the surfaces of the heel which have been burnished and beaded, but it will be understood that a variety of other combinations of tools may well be substituted for use with the particular work support and jacking mechanism herein claimed. The tools, regardless of their particular character, are preferably rotated or operated continuously and means are provided for periodically moving the carrier to present the heels of shoes supported upon the carrier successively to the various tools and then automatically to suspend movement of the carrier and to actuate the shoes while in operative relation with the tools so that various parts of the heel surface are presented to the tools for treatment. When the respective shoes have been treated by the tools, the carrier is automatically moved to advance them to the next station and to return the finished shoe to a discharge station where it is automatically unjacked and presented for removal and replacement by another piece of work.

The particular embodiment of the invention will be more fully understood from the following description in which reference is made to the accompanying drawings.

In general the machine comprises a base 1 having a rearward extension 2 (Fig. 2) for supporting a motor 3. An electric switch 4 is provided at the front of the machine for starting and stopping the motor as desired. During the ordinary operation of the machine the motor is allowed to run continuously. At the two sides of the base suitable standards 5, 6 are provided and these, together with another standard 7 (Fig. 6) at the rear, are interconnected by a horizontal frame member 8 (Fig. 3). Suitably supported in bearings upon each of the standards 5 and 6 are vertical shafts 9 and 10 respectively which are provided with pulleys for belts driven from the motor 3. A similar shaft 7ª (Fig. 6) at the rear of the machine in bearings on the standard 7 is also belted directly to the motor.

Within the casing and mounted on the base of the machine are two suitable standards 11 and 12 designed to provide bearings for various horizontal cross shafts which will be later described. Between these standards there is a centrally disposed vertical spindle 13 which is mounted in a step bearing 14 on the base and through which, with its associated parts, the rotation of the table 72 and the movement of the jacks is controlled. Loosely mounted on the spindle 13 is a gear 15 which meshes with a worm (not shown) mounted on a cross shaft 17 supported in the standards 11 and 12. The shaft 17 is also provided with a gear 18 arranged to mesh with a worm (not shown) loosely mounted on the drive shaft 20. This shaft 20 is horizontally arranged and runs from the front to the back of the machine. It is supported in suitable bearings mounted on the base and is provided at its rear end with a connection to the vertical shaft of the driving motor 3. A clutch is provided which is interposed between the motor and the mechanism of the machine and this clutch is under the control of a jacking treadle 22 which is arranged so that the depression of the treadle effects the jacking of a shoe, while the release of the treadle, to allow its forward end to be elevated by means of a spring 24, operates through a two-part lever 26 pivoted at 28 to start the machine. A cam 30 mounted for rotation with the gear 15 is so arranged that the clutch is disconnected at the completion of one rotation of the cam.

In addition to this mechanism for controlling the starting and stopping of the machine, which is arranged so that in normal use the release of the jacking treadle 22 will cause the machine to start and continue in operation until the gear 15 has completed one full revolution, additional mechanism is provided for stopping the machine, and allowing it to start again, at any time. This comprises an emergency lever 34 which projects horizontally from the forward part of the machine in convenient position to be reached by the operator. The emergency lever 34 is arranged to operate through a vertical lever 36 pivoted on the standard 12 and provided at its lower end with a cam plate 38 co-operating with a section 40 of the two-part lever 26. The arrangement, which in principle is like that described in the patent above-identified, operates to disengage the clutch at any time during the operation of the machine and, when released, allows re-engagement of the clutch so that the machine will start again. The movement of the horizontal shaft 17 is communicated to the table and jack mechanism through a pinion 42 pinned on said shaft immediately adjacent to the standard 11. This pinion 42 meshes with a pinion 44 which, in turn, meshes with a pinion 46, said latter pinions being loosely mounted on shafts 48 and 50 journaled in the standards 11 and 12. Horton clutches are provided immediately adjacent to said pinions which are under the control of levers connected to a bell-crank lever 52 having an arm engaging a groove (not shown) in the lower face of a cam 54 which is mounted for rotation with the gear 15. On the upper face of the cam 54 there is provided a cam 56 suitably connected through an upright shaft 58 to rods 60 arranged, as in my prior machine, to draw the tools out of engagement with the work or allow them to be carried against the work under the impulses of co-acting springs, to be later described.

It will be understood, then, that under the control of the cam 54 the pinions 44 and 46 will be successively clutched to their shafts 48 and 50 to cause rotation of gears 62 and 64 which are connected, respectively, to the spindle 13 and to a sleeve (not shown) connected to a cam member 66. This cam member 66 is associated with a fulcrum member 68 which is pinned to the spindle 13 and which is provided with an upwardly extending hub 70 upon which is rotatably mounted a hub 71 of the turret or table 72. A spider 74 having teeth upon its outer periphery is loosely mounted for rotation about the spindle 13 and is arranged for actuation by means of levers associated with the fulcrum member 68 and the cam member 66 in a manner already described in my prior patent. In the outer ends of the arms of the frame of the table 72, at points separated by 90 degrees, are suitable jack spindles 80, to be later described, while bolted to the upper edge of the hub 71 of said table is a member 82 comprising four diverging arms 83 adapted to support heel plates 84 for engagement with the treads of the heels of the shoes supported on the jacks.

Fundamentally, each of the jack members comprises the spindle 80 (Fig. 4) having a vertical slot co-acting with a transverse pin 86 in a sleeve 87 mounted for rotation in the frame of the work carrying table 72 and provided at its lower end with a pinion 88. In meshing engagement with said pinion is another pinion 89 pivoted on a stud 90 mounted in the frame of the table and adapted to be clutched to a gear 91 mounted on said stud 90, directly below the pinion 89, and in position for meshing engagement with segmental gears 92 on the rim of the spider 74.

Figure 2:
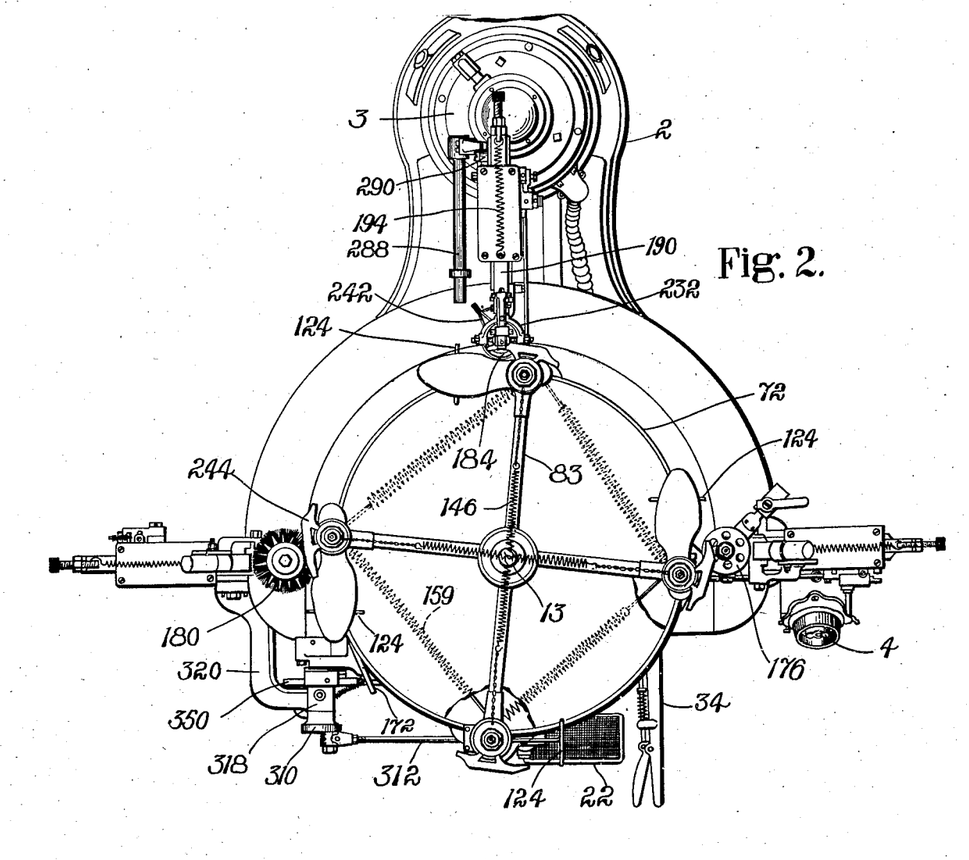
Fig. 2 is a plan view of the machine.
Figure 3:
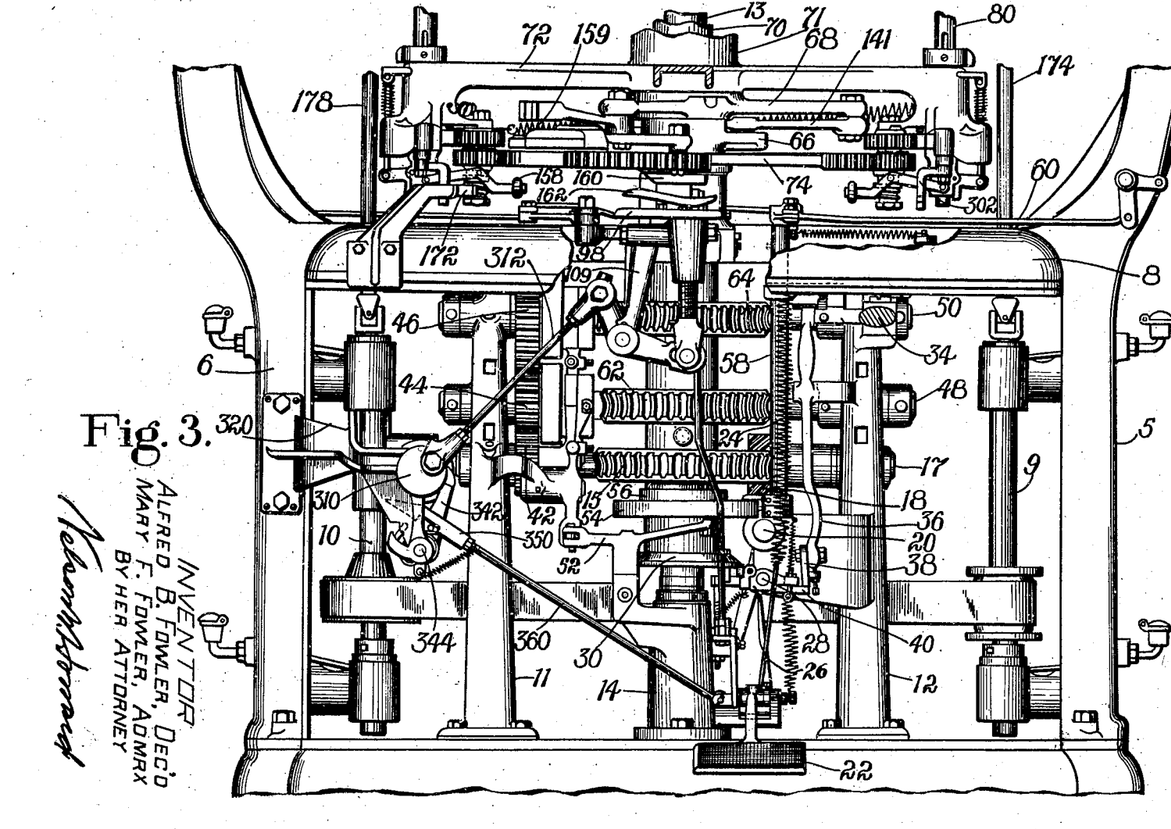
Fig. 3 is a front elevation of the lower part of the machine with the casing removed and certain parts broken away to show the power-operated jacking mechanism.

In order to effect the desired movement of the heel of the shoe past each of the various tools the turret-like table or work carrier 72 is rotated counter-clockwise, as viewed from above as in Fig. 2, to carry the work beyond a tool and locate it so that the breast of the heel faces away from the direction of rotation of the table and the toe of the shoe points in a clockwise direction. This position of the shoe is the reverse of that illustrated in Fig. 2. The table with its jacks is then rotated in a clockwise direction for a short distance so that the operation of the tool starts at one corner of the breast of the heel and continues along its relatively straight face until the tool comes to the sharply curved portion at the rear of the heel. The table is then held relatively still while the jack spindles are rotated by means of their associated pinions and move the curved part of the heel past the tool by rotation of said spindle through approximately 180°. The spindle is then held relatively stationary while the table is again given a fractional rotation in a clockwise direction to bring the other side of the heel past the tool, thus bringing the parts to the position shown in Fig. 2. Because of the fact that the sides of the heel are relatively straight it has been found that motion along the circumference of the table which, in this particular embodiment, is about three feet in diameter, is effective to cause a satisfactory finishing of the side faces of the heels. These movements of the table and the jacks are effected in a manner more fully described in my application above identified by partial rotations of the pinions 44 and 46 in conjunction with the cam member 66, the fulcrum member 68 and the spider 74. In the illustrated embodiment of the machine the point of contact between the work and the tool is always at the same point in the path of movement of the operating face of the tool and this point falls on a line connecting the center of the tool and the center of the turret.

In order more fully to understand the operation of the jack actuating mechanism it becomes necessary to describe in detail the mounting of the jack support. An anti-friction bearing 94 is interposed between the lower end of the slidable spindle 80 (Fig. 4) and a stud 96 which is slidably mounted in the table 72 in alinement therewith. It is, therefore, unnecessary for the stud 96 to rotate when the spindle is being rotated. In order to jack a shoe 97 having a heel 99, pressure may be applied to the lower end of the stud 96, to raise the shoe against the top lift plate 84, by means of a plate 98 (Figs. 1, 3 and 4) which is mounted at the front of the machine on the upper end of a rod 100 mounted for vertical sliding movement in a sleeve 102 attached to the frame. This rod 100 is adjustably secured to a yoke 104 having a pin 106 traversing the slotted end of a bell crank lever 108 which is pivoted on a bracket 109 bolted to the frame 8 of the machine. In order to hold the stud 96 elevated in its jacked position, a cam device 110 is provided which tends frictionally to engage the side of said stud and hold it in any position of vertical adjustment. Secured to the outer end of the upper arm of said cam device 110 is a rod 112 slidably mounted in the frame of the table and normally urged upward by means of a spring 114 surrounding the rod and bearing against a hand plate 116. If it is desired manually to release the jack spindle, pressure on the hand plate 116 will turn the cam device 110 and release it from locking position. At the upper end of the jack spindle 80 there is mounted for tilting movement a section 120 which may carry at its upper end a suitable device for engagement with a shoe at a point in vertical alinement with the heel. The section 120 is provided with a spring pressed plunger (not shown) adapted to tip this portion of the jack forward toward the operator when the jack is at the front of the machine ready for attention by the operator. A toe rest wire 122 having a transverse shoe supporting portion 124 is secured to the jack portion 120. When the jack spindle 80 is raised to hold the shoe rigidly in position the section 120 is automatically erected and tipping thereof is prevented by means shown and described in my prior application above identified.

On the outer end of each of the arms 83 (Figs. 1 and 4) extending out over the jack spindles there is revolubly mounted a sleeve 126 (Fig. 4) having an anti-friction bearing at 128 with the lower surface of the arm and retained in position therein by a collar 130. Mounted within this sleeve and revoluble therewith is a stud 132 within which there is slidably mounted a plunger 133 carried at the lower end of a rod 134 spring-pressed downwardly by means of a spring 136 with the downward limit of movement adjustably determined by nuts 138. At the lower end of this plunger 133 there is mounted the top lift engaging plate 84 having flanges 140 (Figs. 6 and 7) for engagement with the breast of the heel 99. Connected with the collar 130 by means of a screw 142 is a short piece of chain 144, the loose end of which is connected by means of a suitable spring 146 (Fig. 2) to the loose end of the chain on the opposing arm. When the shoe has been unjacked at the station at the front of the machine, this spring will rotate the top lift plate 84 so that the flanges 140 will be at its left-hand edge ready for engagement with the breast of the heel of the shoe to be jacked therein, thereby to guide the operator in jacking the shoe.

Figures 4, 5:
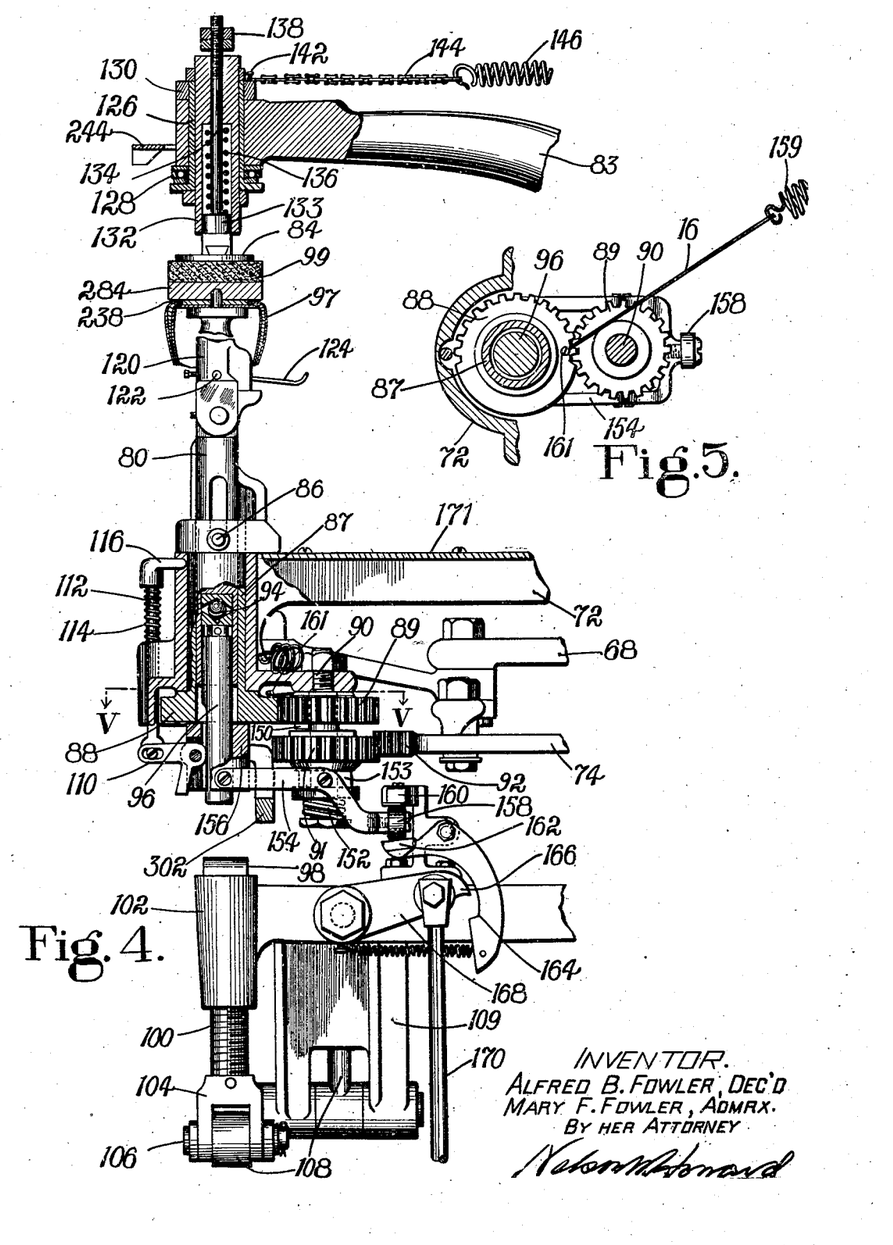
Fig. 4 is a detailed view in elevation with parts broken away and in section showing one of the jacks and the associated parts in the position which they occupy just after a shoe has been jacked and before the turret has started to move.
Fig. 5 is a detailed section taken on the line V—V of Fig. 4.

In order to prevent rotation of the jack spindle 80 by relative movement of the gear 92 on the spider 74 when said spindle is at the jacking position at the forward part of the machine, there is provided a dog clutch 150 (Fig. 4) between the pinions 89 and 91 and this clutch is normally held in operative engaging position by a spring 152 surrounding the stud 90 and bearing against a nut on the lower end thereof. The hub of the gear 91 is provided with an annular recess in which there is a collar 153 attached to the arms of a bifurcated lever 154 pivotally mounted on that portion 156 of the frame of the turret 72 which surrounds the lower end of the stud 96 and said lever 154 is provided at its outer end with a roll 158. When the jack approaches the forward part of the machine this roll is adapted to enter a path provided between an upper fixed member 160 and a lower pivoted member 162 (Figs. 3 and 4). Engagement with the upper member serves to lower the roll 158 and disengage the clutch 150.

After the clutch 150 has been disengaged, the jack spindle will be released from the rotating mechanism and will have been left in a position proper for the application of a shoe to take the place of that which has just been finished. In order to facilitate this operation and to avoid accidental turning movement of the jack spindle in such a fashion as to annoy the operator in the application of a new piece of work, springs 159 are attached at one end to the frame of the turret 72 and provided at the other end with a flexible wire 16 by means of which they are secured to pegs 161 upon each of the gears 88. As each jack spindle is rotated during the presentation of the piece of work to a tool, the wire is wound up around the hub of the gear 88, thereby tensioning the corresponding spring 159. The point of attachment of the wires 16 to the gears 88 is such, as is shown in Fig. 5, that the springs 159 will be effective to rotate said gears 88 to a position where the untoothed portions of the peripheries of the gears contact with the teeth of the meshing gears 90 and prevent further rotation of said gears 88.

The lower pivoted member 162 is extended downwardly at the rear and is provided with a notch 164 for engagement with the pointed end 166 of a finger 168 to which a rod 170 connected to the treadle 22 is pivoted. It will be observed that the engagement of the notch 164 with the end 166 of said finger 168 makes it impossible to depress the treadle 22 for jacking a shoe until the roll 158 has entered the path provided between the members 160 and 162. Suitable cover members 171 (Fig. 1) are provided between the arms of the rotating table to exclude the dirt from the operative parts and cover members are provided around the circumference of said table for a similar purpose. In order to release the jack spindle as it approaches the unjacking position and to cause the shoe to fall forwardly, a suitable tripping member 172 (Figs. 1, 2 and 3) is mounted on the frame of the machine in position for engagement with the lower end of the cam member 110. This tripping member 172 has its surface suitably formed to push the lower end of the locking member 110 inwardly toward the center of the machine against the force of the spring 114 and thereby to release the jack spindle which will fall under its own weight.

In order that there may be no danger of interference between the tools and the work at times when the work is passing from one station to another provision is made for moving the tool carrying shafts toward and away from the work at the desired time. It will be noted from an inspection of Fig. 1 that a shaft 174 is provided for rotating a burnishing iron 176. A shaft 178 at the left side of the machine has mounted on its upper end a polishing brush 180, while at the rear of the machine (Fig. 6) is a shaft 182 which is arranged to drive a beading tool 184. A universal joint (Fig. 3) is provided between each of these shafts and the driving shafts, such as 9 and 10, so that it is possible by proper devices, to be later described, to cause the tools to approach the work or recede therefrom at suitable intervals.

Figure 6:
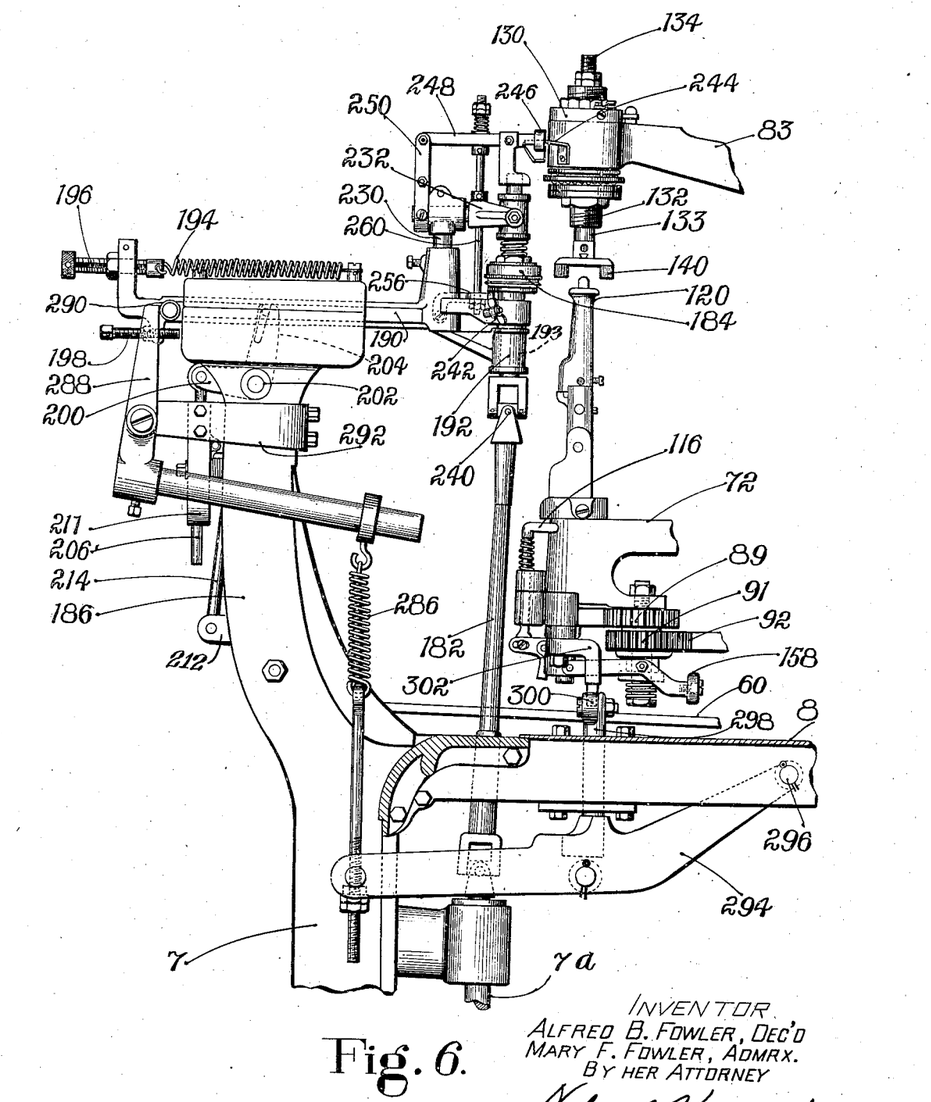
Fig. 6 is a side elevation of the beading tool mechanism showing its relation to an associated jack.

It will be seen from Fig. 6 that, in an upward extension 186 of the standard 7 forming part of the frame of the machine, there is provided a slide 190. Secured to the forward end of the slide 190 is a bearing collar 192 for a stub shaft 193 connected to the driving shaft 182. Any motion communicated to this slide 190 will, therefore, be passed on to the operating tool. For the purpose of urging the tool toward the work there is provided a spring 194 one end of which is attached to the standard extension 186 and the other end of which is adjustably connected by means of a screw 196 to the outer end of the slide 190. In order to limit the inward movement of the slide a suitable stop screw 198 may be mounted in a depending lip on the slide and arranged to engage with the frame of the machine. Movement of the slide away from the work is effected through a bell crank lever 200 pivoted at 202 in the frame of the machine and having an upstanding end 204 adapted to enter a slot in said slide 190 to engage a pin therein so that upon the depression of the outer end of the bell crank lever, the slide will be drawn outwardly to carry the tool away from the work in opposition to the tension of the spring 194. Connected to the outer arm of the bell crank lever 200 is a depending rod 206 guided in the arms 208 and 210 of a bracket 211 forming an extension of a bracket 292 secured to the upright extension 186 of the standard 87. This rod 206 is connected to one of the rods 60 for withdrawing the tools through a bell crank lever 212, a vertical rod 214 and a clamping mechanism comprising a collar 216 and a short arm 218 eccentrically secured in said collar. This arm 218 is so arranged that when its outer end is pulled down by the rod 214 it will grip the rod 206 and cause said rod to be pulled down to draw the slide away from the work. A spring 220 is interposed between the lower arm 210 of the bracket and the under side of the collar 216 to lift said collar on the rod 206 when the bite of the arm 218 is released. The clamping mechanism is, therefore, effective instantly to withdraw the slide when the rod 60 is moved but the position of the slide is independent of the extent of upward movement of the rod 214.

The second operation performed by the particular embodiment of the invention shown in the drawings is that of beading the upper edge of the heel adjacent to the rand crease and polishing the chamfered edge of the sole and heel base. In the arrangement shown in Figs. 6 and 7 a slide 190 has adjustably connected to its forward end a post 230 supporting a yoke 232 carrying a bearing 234 which, with the bearing collar 192, guides the stub shaft 193 on which is mounted the beading tool 184. Formed with the beading tool is a circular flange 236 adapted to enter the rand crease 238 in the shoe 97 and finish the chamfered edge of the sole and heel base thereof and at the same time ensure the proper location of the beading tool 184 with respect to the heel. Inasmuch as the stub shaft 193 must be located in an approximately vertical relation to the machine it is necessary to provide an additional universal joint 240 between it and the driving shaft 182. A frictional heating devise 242 may be applied to the rotating parts.

When, during the cycle of operation of the machine, the slide 190 carrying the beading tool is allowed to move forward to bring the tool into engagement with the rand crease 238 of the shoe it is, of course, essential that the flange 236 of said tool shall enter the rand crease readily without scarring the upper and enter it completely in order that the line of beading will be properly positioned upon the periphery of the heel. To this end the beading tool 184 is mounted for floating movement upon the stub shaft 193 and is normally positioned when the parts are in the relation illustrated in Fig.

Figure 7:
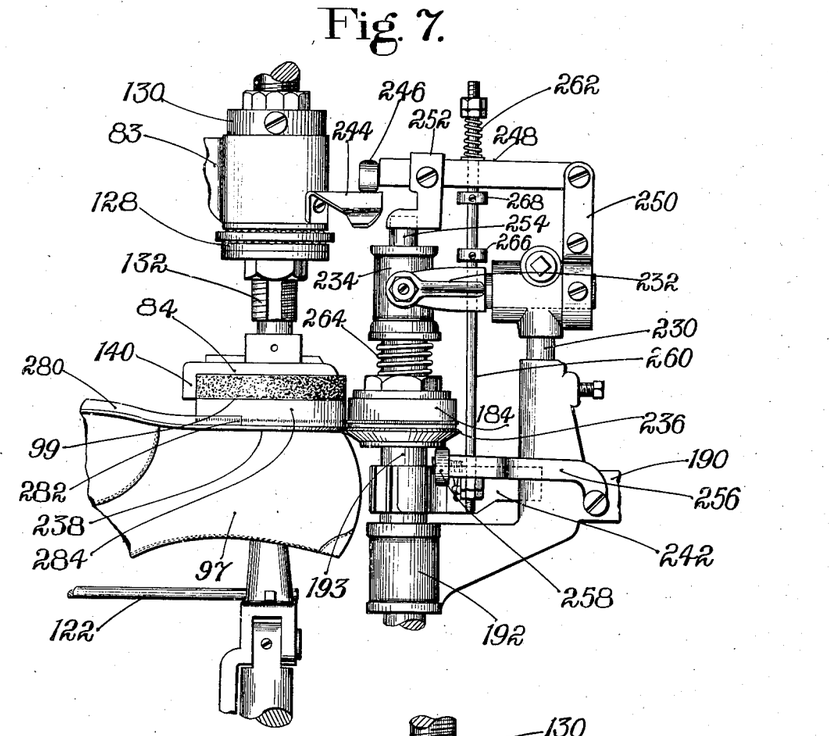
Fig. 7 is an enlarged view of the beading tool as it is applied to the rear end of a shoe.
Figure 8:
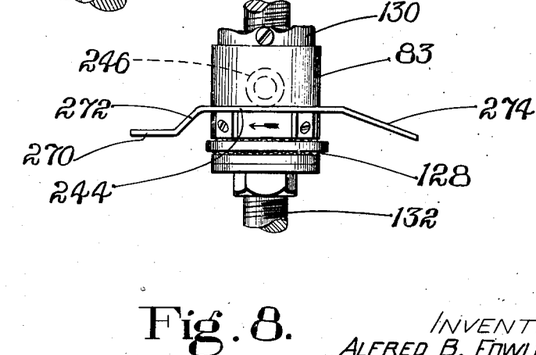
Fig. 8 is a fragmentary view showing a cam for controlling the beading tool.
Figure 9:
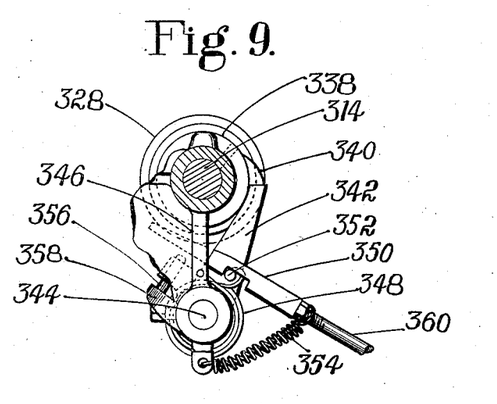
Figs. 9 and 10 are fragmentary details of the clutch and associated parts by means of which power is applied to the jacking mechanism.
Figure 10:
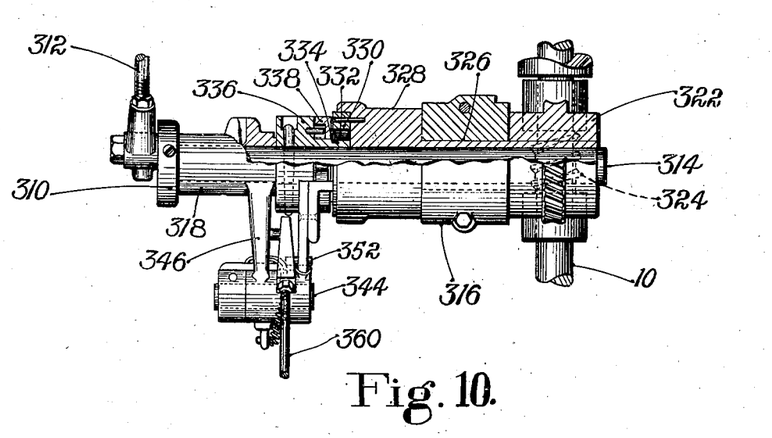

6 so that the flange 236 is very slightly below the level of the rand crease 238. The lower surface of the flange 236 is inclined downwardly and it may be that it will slide over the upper sufficiently to allow the edge of the flange to enter the rand crease as desired. In order more completely to control this action, however, novel mechanism has been provided to press resiliently against the under side of the beading tool 184 so as to make sure that the upper surface of the flange 236 is held firmly against the chamfered edge of the sole and heel base. This mechanism comprises cams 244 secured to each of the arms 83, as illustrated in Figs. 7 and 8, and each of these cams is provided with a flat intermediate portion and sloping end portions and is arranged to co-act with a roll 246 mounted at the end of a lever 248 which is arranged through mechanism to be described to exert a pressure upwardly on the beading tool. Lever 248 is pivotally mounted upon a bracket 250 attached to the post 230 and is provided with a guiding clip 252, the lower ends of which engage the opposite sides of the reduced upper end 254 of the stub shaft 193. Pivoted on the slide 190 is a bent lever 256 having a roll 258 at its outer end for engagement with the under side of the beading tool. A rod 260 connects the levers 248 and 256 and a spring 262 is interposed between the lever 248 and said rod so that when the roll 246 at the outer end of the lever 248 rides up on the cam 244 it will apply a resilient lifting force transmitted through the rod 260 to the lever 256 and thence to the beading tool. A spring 264 surrounds the stub shaft 193 between the bearing sleeve 234 and the upper side of the beading tool, said spring being arranged to act in opposition to the action of the mechanism just described to hold the beading tool in a desired position upon the shaft. Stop collars 266 and 268 are mounted upon the rods 260, the lower of these collars being arranged to engage the fork 232 thereby to limit the downward movement of the rod 260 and to determine the initial position of the beading tool when the slide is moved forward to the position shown in Fig. 6. The upper stop 268 serves at the same time to determine the initial position of the lever 248 so that the roll 246 will be in position to ride over the flat end portion 270 (Fig. 8) of the cam plate 244 and up the inclined portion 272 thereof to bring it to the flat, intermediate portion. As the beading operation upon each individual shoe is completed, the cam plate 244 moves in the direction of the arrow in Fig. 8, thereby to carry the roll 246 from the flat intermediate portion of the cam 244 down an inclined portion 274 to bring the parts to the position shown in Fig. 6 ready for the slide to be withdrawn to carry the tool away from the work under the impulse of one of the rods 60 (Figs. 1 and 3). The arrangement just described, therefore, provides for the exact positioning of the beading tool so that the flange 236 thereof will enter the rand crease without scarring the upper of the shoe and, in addition, applies an upward pressure against the tool to hold it firmly in place during its operation upon the shoe.

Figure 1:
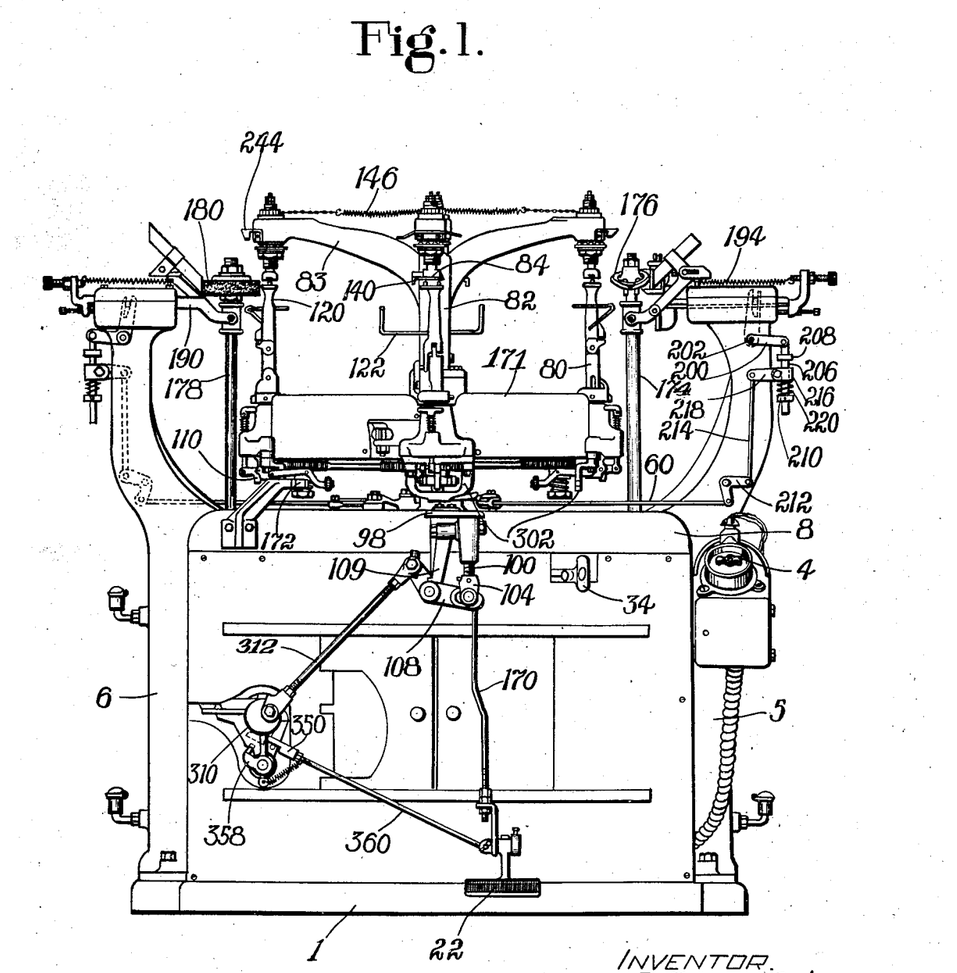
Fig. 1 is a front elevation of the complete machine.

In shoes of a certain type, an example of which has been shown in Fig. 7, the outer sole 280 does not extend wholly to the rear end of the shoe but is terminated at 282 at a position slightly to the rear of the breast of the heel. It may be, and frequently is true, that the sole leather is somewhat less hard than the heavily compressed heel base portion 284. Consequently, it has been found that when a machine of this type is applied to the beading of such a shoe the spring 194 may throw the beading tool against the shoe at a point adjacent to the heel breast with more force than is necessary. Such a force if adjusted so that the beading tool operates properly on the heavily compressed heel base 284, will be apt to dig in and unduly indent portions of the rear end of the short sole which underlie the heel base. Accordingly, it is found preferable so to adjust the spring 194 that the initial pressure applied to the slide is suitable for the application of a pressure for the work of the tool on the rear end of the sole where it underlies the heel base. Additional mechanism is then provided to apply more pressure urging the slide forwardly to press the tool against the work when the rotatable table 72 is in such position that the tool is acting upon the heel base itself. This pressure is applied yieldingly through a spring 286 attached at its upper end to the lower arm of the bell crank lever 288 the upper arm of which bears against a roller 290 on the slide 190. This bell crank lever is pivotally mounted upon the bracket 292 secured to the upright extension 186 of the standard 7. The lower end of the spring 286 is secured to a lever 294 pivoted at 296 on the under side of the frame 8 of the machine and provided with an actuating slide 298 journaled in this frame and having a roller 300 at its upper end. U-shaped cam members 302 are attached to the frame 72 of the rotatable table beneath each of the jacks. The shape of these cams is shown in Fig. 1 and the arrangement is such that when the table and the jack spindle are moving the shoe with respect to the tool so that the tool is acting on the heel base, then the cam 302 corresponding to the shoe which is at the beading tool station will act through the levers 294 and 288 and the interposed spring 286 resiliently to press forward the slide 190 and thus urge the beading tool 184 more firmly into contact with the work.

From the above description it will be seen that the machine is adapted to perform the three operations of burnishing, beading and polishing the heel of a shoe and it is within the scope of the invention that the heel should be so treated either before or after its attachment to the shoe. In operating the machine, the operator will place a shoe or heel on the upper portion 120 of the jack support so that the tread of the heel underlies the plate 84 and the breast of the heel rests against the flanges 140 of the top lift plate 84. He will then depress the treadle 22 and set in motion mechanism to be described for lifting the rod 100 a predetermined distance to raise the work into firm engagement with said top lift plate 84 against the action of the spring 136 to a predetermined extent as will be later explained. In order that this operation of jacking shoes as they are presented successively to the machine may not become burdensome to the operator, power mechanism is provided for raising the rod 100 when the operator depresses the treadle 22. This mechanism comprises a power actuated crank 310 connected by an adjustable pitman 312 to the bell crank lever 108. It will be understood that the throw of the crank is not adjustable but is a fixed amount. It is possible, however, to vary the limit of the upward movement of the plate 98 on the upper end of the rod 100 by adjusting the length of the pitman 312, thereby effecting the same result as that secured in the foot-operated device by providing an adjustable stop at the bottom of the rod 100 to limit its upward movement, as shown in my application above identified. This adjustment of the length of the pitman 312 will bring the work into the proper relation to the burnishing iron and polishing brush and especially the location of the rand crease with respect to the beading tool and may be varied whenever the style of work being handled by the machine is changed. The crank 310 is secured to the outer end of a jack shaft 314 mounted in suitable bearings 316 and 318 formed in a bracket 320 secured to the frame of the machine. A worm gear 322 at the rear end of the shaft 314 meshes with a worm 324 on the upright shaft 10 which drives the brushing tool. It will be understood that this tool is rotated constantly during the operation of the machine so that the shaft 10 is always in rotation and ready to drive the power jacking mechanism.

This power jacking mechanism includes a clutch mechanism of the Horton type, interposed between the worm 322 and the shaft 314, so that the shaft 314 may be driven intermittently at the will of the operator when it is desired to jack a shoe. The worm 322 is secured in position upon a sleeve 326 forming an extension of a hub-shaped portion 328 of the clutch. This hub 328 is recessed to receive a hardened steel ring 330 which is pinned thereto and within which ride the rollers 332 of the Horton clutch. Within these rollers and arranged to press them into gripping relation with the ring 330 is a cam-shaped member 334 forming an extension of the collar 336 which is pinned to the shaft 314. A cage 338 is interposed between the collar 336 and the ring 330. This cage is grooved to receive springs secured at one end of the cage and at the other end to the collar 336. The outer periphery of the cage 338 is provided with a lug 340 arranged to be engaged by the upper end of an arm 342 and secured to a pin 344 journaled in the lower end of a bracket 346 forming an extension of the bracket bearing-member 318. A spring 348 is arranged to hold the arm 342 in engagement with the periphery of the cage 338 so that it will engage the lug 340 after a single rotation of the shaft 314 and thereby disconnect the clutch in a fashion well understood in the art. The disengagement of the arm 342 from the lug 340 is effected by means of a notched trigger 350 engaging a pin 352 upon said arm. The trigger is normally held in engagement with the pin by means of a spring 354 and is arranged to be lifted off the pin, after the trigger has released the clutch, by means of a sliding pin 356 suitably mounted in the bracket 346 and arranged to be lifted to push the upper end of the trigger 350 up so as to disengage it from the pin 352. To this end an arm 358 is secured to the end of the pin 344. The trigger 350 is mounted upon the outer end of a rod 360 which is secured (Figs. 1 and 3) to the jacking treadle 22. The arrangement, then, is such that assuming that a jack is in proper position so that it has released the latch 164 to allow the depression of the rod 170 secured to the treadle 22, then the treadle may be depressed by the operator to pull on the rod 360 and thereby to connect the clutch to cause the rotation of the crank 310, thereby to elevate the rod 100 to move up the jack spindle so as to clamp the shoe. It will be observed that the arrangement is such that no matter how long the operator holds his foot upon the treadle 22, only one rotation of the crank 310 will be had because the upper end of the trigger 350 will have been lifted off the pin 352 as soon as the trigger has moved the arm 342 out of the engagement of the lug 340. In case the shoe is not properly jacked at the first operation of the jack, it is possible to release the jack by depressing the hand-plate 116 to release the jack spindle. In order that the turret may not be started by the lifting of the treadle 22 to repeat the jacking operation, the emergency lever 34 should be operated to prevent this rotation of the turret. The jacking operation may then be repeated as many times as necessary and the emergency lever 34 released to allow the rotation of the turret after the shoe has been properly jacked.

Assuming that the motor 3 is rotating, no operation will take place upon the depression of the treadle 22 except to jack the shoe but, as soon as the treadle is released, the driving clutch will be spring-pressed into operative engagement, thus starting rotation of the gear 15 and the cams 54, 56 and 30 which are connected thereto. This will control the Horton clutches, to connect first the pinion 44 and then the pinion 46 to its respective shaft so that it will rotate the spindle 13 and then the sleeve carrying the cam 66. This will cause the table to rotate through aproximately 90° and, as more fully illustrated and described in the above-mentioned patent, during the rotation of the table from the jacking position to the first work station, there will be a relative movement of the spider 74 which will rotate the gear 91 associated with that spindle on which the work has just been mounted and thereby bring the parts of the dog clutch 150 into position to snap into engagement so that in subsequent movements of the machine the rotation of the gear 91 will be communicated to the jack spindle. Between other stations of the machine the movements of the spider 74 will cause a rotation of any particular jack spindle, as it approaches and passes the corresponding tool, to bring the work back to its original position so that when the machine is viewed from above, the toe of the shoe will point in a clockwise direction around the table or a direction opposite to that shown in Fig. 2. The movement of the table will be such as to carry the corners of the breasts of the heels and their sides beyond the operating tools. The table will then rotate slightly in a clockwise direction so that the various tools will operate along the straight sides of the heels, then the table will remain still and a movement of the spider 74 will cause a rotation of the various jack spindles (except of course that at the jacking station) and cause the tools to operate upon the curved rear surfaces of the heels. There will then be a further rotation of the table in a clockwise direction which will bring the other straight sides of the heels past the various tools to finish the work upon each heel.

Having thus described the invention, what is claimed as new and desired to be secured by Letters Patent of the United States is:—

1. A shoe-holding device comprising, in combination, a flat clamping member against which the heel of the shoe may be held clamped, a cooperating clamping member to be inserted in a shoe, a jacking member for moving one of said members to bring them into clamping relation to the shoe, and a one-way clutch for holding the movable member of said clamping device in clamped position, one of said members having means including a stem constructed and arranged to determine the position of the rand crease of the shoe as the shoe is jacked.

2. In a machine of the class described, a resiliently supported top lift engaging plate, a work supporting spindle in line with said plate, means for moving said spindle toward the plate through an adjustably predetermined distance to clamp the work, and means for holding the spindle in any work clamping position.

3. In a machine of the class described, a rotatably mounted top lift engaging plate provided with a gaging device arranged to engage a characteristic part of the heel, and means for rotating said plate to a predetermined position when free.

4. In a machine of the character described, a rotatably mounted resiliently supported top lift engaging plate, heel breast engaging members on said plate, resilient means for rotating said plate to a predetermined position when freed from the work, a work supporting device movable toward and away from said plate, means for moving said device a predetermined distance, and means for holding the same in position.

5. A heel finishing machine having, in combination, a jack, a heel finishing tool, means relatively to move the jack and the finishing tool into heel finishing position, and additional means resiliently to press the tool against the work after the tool has been brought into engagement therewith.

6. A heel finishing machine having, in combination, a jack to support a shoe to be operated upon, a heel finishing tool mounted for relative movement with respect to the shoe carried on said jack, means for producing relative movement between the jack and the tool to bring the tool into engagement with the work, and means for increasing the pressure of the tool against the work during an intermediate portion of its travel about the heel in engagement therewith.

7. A heel finishing machine having, in combination, a jack to support a shoe to be operated upon, a tool carrying shaft, a tool mounted to float thereon, means for moving said tool shaft to bring the tool into engagement with the work, and means for applying pressure axially of the tool shaft to hold the tool in engagement with the work.

8. A heel finishing machine having, in combination, a jack to support a shoe to be operated upon, a tool carrying shaft, a tool mounted to float thereon, means for moving said tool shaft to hold the tool in engagement with the work, and means for applying an increased pressure lengthwise of the work and laterally of the work to hold the tool more tightly in engagement with the work during a portion of the time in which they are in engagement.

9. A heel finishing machine having, in combination, a jack to support a shoe to be operated upon, a tool carrying shaft, a heel beading tool having a rand crease entering flange mounted for floating movement on said shaft, means for movably supporting said shaft constructed and arranged to carry said tool into engagement with the shoe so that the rand crease entering flange is pressed against the rand, and means for applying additional pressure to hold said flange against the rand after the tool has been brought into engagement therewith.

10. A heel finishing machine having, in combination, a jack to support a shoe to be operated upon, a heel beading tool having a rand crease entering flange, means for supporting said tool constructed and arranged to bring said flange into the rand crease with the tool in engagement with the heel, means for moving said jack to bring various parts of the periphery of the heel into engagement with the tool, and means for applying pressure to lift the flange to hold it against the rand of the shoe during the relative traversing movement.

11. A heel finishing machine having, in combination, shoe supporting means, a tool shaft, a heel beading tool having a rand crease entering flange mounted to float on said shaft, means for producing a relative movement of the tool and the shoe supporting means to bring the tool into engagement with the heel and carry it about the periphery thereof, means constructed and arranged resiliently to press the tool against the rand during said relative traversing movement, and means moving with said shoe support for operating said last-mentioned means.

12. A heel finishing machine having, in combination, shoe supporting means, a heel finishing tool, means for producing a relative movement between said tool and said shoe supporting means to carry the tool around the periphery of the heel of the shoe, and means for varying the action of the tool upon the heel during a portion of the relative traversing movement.

13. A heel finishing machine having, in combination, shoe supporting means, a heel finishing tool, means for producing a relative movement between said tool and said shoe supporting means to carry the tool around the periphery of the heel of the shoe, and means to vary the pressure between the tool and the work during a portion of said relative traversing movement.

14. A heel finishing machine having, in combination, a jack to support a shoe, a heel finishing tool, means for moving said tool into engagement with said shoe, means for producing a relative traversing movement between the tool and the shoe, and means for applying increased pressure between the tool and the shoe during the intermediate portion of the relative traversing movement of the tool about the heel of said shoe, 15. A shoe finishing machine having a carrier, a plurality of shoe supporting jacks each comprising relatively movable parts mounted on said carrier, power means for moving said carrier to bring said jacks successively into position at a jacking station, and operator controlled means for applying the power used for rotating said carrier to cause movement of a movable member of that shoe supporting jack which is at a jacking station to clamp a shoe thereon.

16. A shoe finishing machine having a carrier, a plurality of jacks on said carrier constructed and arranged to clamp a shoe, each comprising a vertically movable spindle, means for moving said carrier, and power operated means for lifting said spindles successively to clamp shoes on the said jacks.

17. A shoe finishing machine having a carrier, a plurality of jacks on said carrier constructed and arranged to clamp a shoe, each comprising a vertically movable spindle, means for moving said carrier, power operated means for lifting said spindles to clamp shoes on said jacks, and an operator controlled device for initiating the action of said power operated means.

18. A shoe finishing machine having a carrier, a plurality of jacks on said carrier, constructed and arranged to clamp a shoe, each comprising a vertically movable spindle, means for moving said carrier, power operated means for lifting said spindles to clamp shoes on said jacks, an operator controlled device for initiating the action of said power operated means, and means actuated by said carrier for controlling the operation of said operator controlled device.

19. A shoe finishing machine having, in combination, a carrier, a plurality of shoe jacking devices rotatably mounted on said carrier, means for producing a rotation of said shoe jacking devices relative to said carrier, means dependent upon the position of the carrier for releasing one of said jacking devices from the rotating means, and means tending to turn said jacking device to a predetermined position after it has been released from the rotating means.

20. A shoe finishing machine having, in combination, a carrier, a plurality of shoe jacking devices rotatably mounted on said carrier, means for producing a rotation of said shoe jacking devices relative to said carrier, means dependent upon the position of the carrier for releasing one of said jacking devices from the rotating means, and means for resiliently holding said jack in position after it has been released from said jack rotating means.

21. A heel finishing machine having, in combination, a carrier, a plurality of shoe jacking devices on said carrier each comprising upper and lower clamping means rotatably mounted in respect to the carrier, means for rotating one of the clamping means of one of said jacking devices with respect to the carrier, means dependent upon the position of the carrier for releasing said rotating means, and means for returning both said upper and lower clamping means to a predetermined position when released from said rotating means.

22. A heel finishing machine having, in combination, a shoe support, a tool supporting slide adjacent said shoe support, resilient means urging said slide toward the shoe support, means for holding said slide against the action of said resilient means constructed and arranged to allow the slide to be moved intermittently to carry the tool into engagement with the work, and means for increasing the pressure between the tool and the work after the tool has been brought into engagement.

In testimony whereof I have signed my name to this specification.

MARY F. FOWLER,
*Administratrix of the Estate of Alfred B. Fowler, Deceased.*